(12) United States Patent
Kukreja et al.

(10) Patent No.: US 11,778,025 B1
(45) Date of Patent: Oct. 3, 2023

(54) CROSS-REGION DIRECTORY SERVICE

(71) Applicant: Amazon Technologies, Inc., Seattle, WA (US)

(72) Inventors: Dinesh Ramesh Kukreja, Seattle, WA (US); Joseph Donald DeMate, Sammamish, WA (US); Keith Littleton Croney, Seattle, WA (US); Peter Lopes Pereira, Bothell, WA (US); Ankur Aggarwal, Seattle, WA (US); Ameya Chikodi, Seattle, WA (US); Gurveer Singh Pahuja, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 156 days.

(21) Appl. No.: 16/829,791

(22) Filed: Mar. 25, 2020

(51) Int. Cl.
*H04L 67/1095* (2022.01)
*G06F 16/23* (2019.01)
*G06F 16/27* (2019.01)
*H04L 45/02* (2022.01)

(52) U.S. Cl.
CPC ........ *H04L 67/1095* (2013.01); *G06F 16/2393* (2019.01); *G06F 16/27* (2019.01); *H04L 45/02* (2013.01)

(58) Field of Classification Search
CPC ... H04L 67/1095; G06F 16/27; G06F 16/2393; H04L 45/02
USPC ........................................................ 709/238
See application file for complete search history.

(56) References Cited

U.S. PATENT DOCUMENTS

| | | | | |
|---|---|---|---|---|
| 6,324,571 | B1* | 11/2001 | Hacherl ................. | G06F 9/468 707/999.1 |
| 2008/0062891 | A1* | 3/2008 | Van der Merwe et al. ................. | H04L 45/04 370/254 |
| 2010/0071053 | A1* | 3/2010 | Ansari et al. .......... | G10L 15/22 726/12 |
| 2011/0264865 | A1* | 10/2011 | Mobarak et al. .... | G06F 12/121 711/141 |
| 2012/0254357 | A1* | 10/2012 | Kawakami et al. ........................ | H04N 21/234309 709/217 |
| 2014/0280884 | A1* | 9/2014 | Searle et al. ........... | H04L 43/20 709/224 |
| 2015/0134827 | A1* | 5/2015 | Shah et al. ........... | G06F 21/604 709/226 |

(Continued)

*Primary Examiner* — Anh Nguyen
(74) *Attorney, Agent, or Firm* — NICHOLSON DE VOS WEBSTER & ELLIOTT LLP

(57) ABSTRACT

Techniques for managing a cross-region directory service are described. A method of managing a cross-region directory service may include establishing a cross region peer connection between a first directory virtual network of a directory service in a first region of a provider network and a second directory virtual network of the directory service in a second region of the provider network, the second directory virtual network associated with a pre-allocated classless interdomain routing (CIDR) range, replicating, by a cross-region replicator, data or metadata associated with the directory service from the first region to the second region, and orchestrating one or more updates to the directory service in the second region based at least on the data or metadata replicated to the second region.

17 Claims, 8 Drawing Sheets

(56) References Cited

U.S. PATENT DOCUMENTS

| | | | |
|---|---|---|---|
| 2015/0229723 A1* | 8/2015 | Bosman et al. | H04L 67/1095 707/784 |
| 2015/0271132 A1* | 9/2015 | Erb | H04L 61/1511 709/223 |
| 2016/0134616 A1* | 5/2016 | Koushik et al. | G06F 21/335 726/9 |
| 2018/0241617 A1* | 8/2018 | Radzikowski et al. | G06F 8/656 |
| 2020/0117547 A1* | 4/2020 | Danilov et al. | G06F 3/067 |
| 2020/0236047 A1* | 7/2020 | Hira et al. | H04L 12/4641 |
| 2021/0181962 A1* | 6/2021 | Dai et al. | G06F 3/0605 |

* cited by examiner

CROSS-REGION DIRECTORY SERVICE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for a cross-region directory service. According to some embodiments, directory services can be replicated across regions of a provider network, enabling a customer's directory to be used to manage resources and users wherever those resources and users are located. Modern organizations have users, applications, and resources spread across various geographic locations. Directory services are typically implemented in a single region of a provider network. Implementing a directory service in multiple regions, to improve performance across the enterprise and/or to provide disaster recovery, backup, or other features, requires customers to manually deploy, configure, monitor, update, secure, and maintain a global directory infrastructure. This level of management overhead is significant, complex, and costly.

Embodiments enable customers to expand their directory in different regions of a provider network. This includes building out separate domain controllers in different regions with and enabling cross region directory replication among all of them. Updates are replicated across regions in a manner that complies with the security requirements or each region, such that these updates are provided in a secure, scalable, and isolated manner. Additionally, control plane metadata is replicated across regions. This enables local reads, availability, and low latency across different directory service application programming interfaces which are used to describe existing directory metadata for an expanded directory in a remote region. Embodiments ensure that changes are replicated from the region in which the change was made to those regions which need to apply the changes. By extending directory infrastructure across regions, directory services have higher availability, allowing customers fall back on infrastructure from another region if one region goes down.

Figure 1:
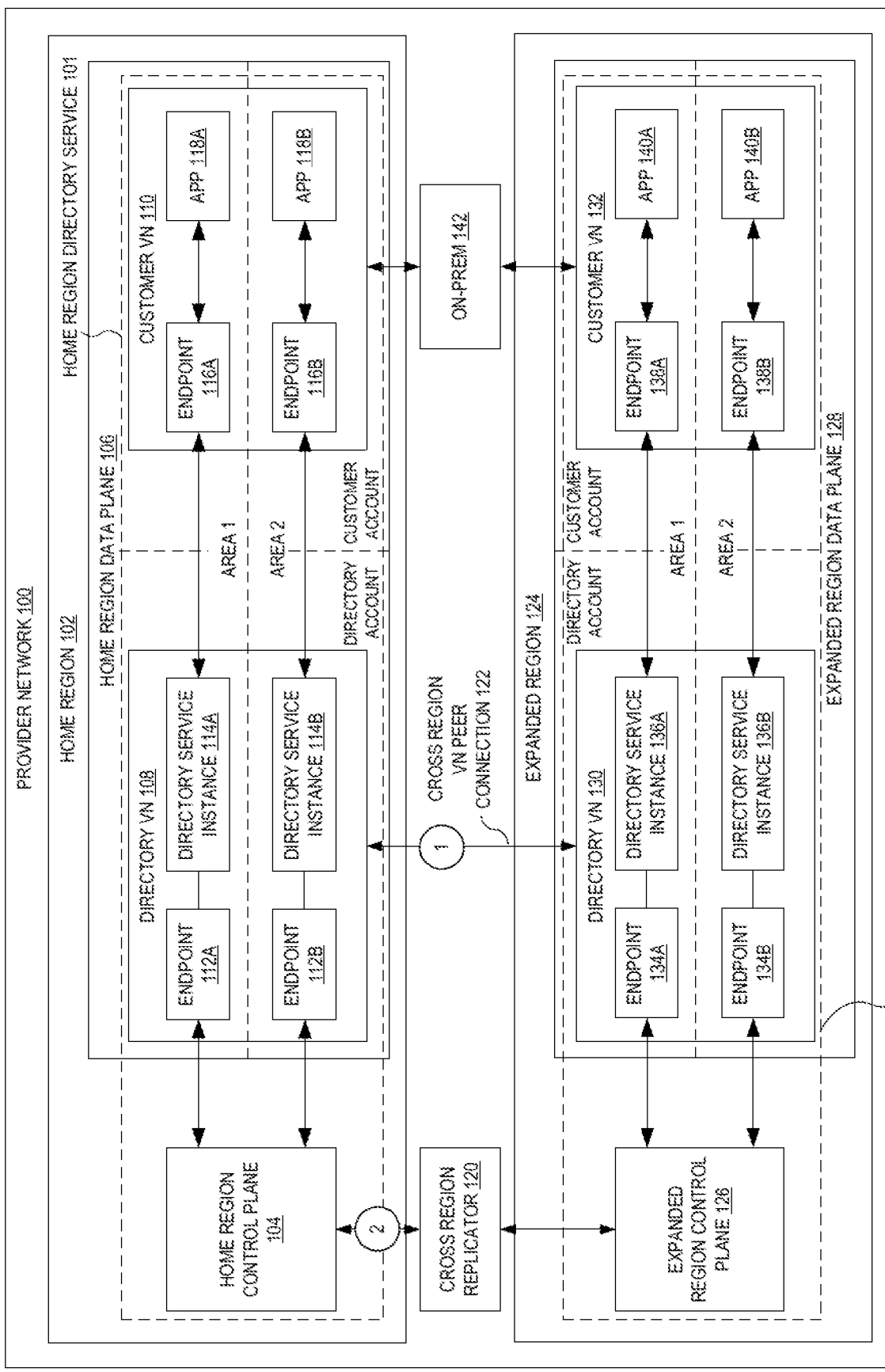
FIG. 1 is a diagram illustrating an environment for a cross-region directory service according to some embodiments.

FIG. 1 is a diagram illustrating an environment for a cross-region directory service according to some embodiments. Traditionally, directory services (e.g., name services) have been limited to a single region. However, it is advantageous to expand single region resources, such as directory service 101, to multiple regions (e.g., expanded region directory service 103), to provide for disaster recovery, lower latency, higher availability, etc. Directory service 101 may provide various features, including global and regional features, that enable a customer to maintain and manage a directory. The directory service enables a customer to locate, manage and administer their network resources (e.g., storage volumes, files, network devices, users and groups, etc.) and may additionally provide features such as single sign on support, multifactor authentication, and other access control features.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane 102 of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ provides an isolated failure domain including one or more data center facilities with separate power, separate networking, and separate cooling from those in another AZ. AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code - typically without the user having any control of or knowledge of the underlying compute instance(s) involved.

In various embodiments, a "serverless" function may include code provided by a user or other entity – such as the provider network itself – that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

A cross-region directory service, operating in multiple regions of provider network 100, needs to be able to provide a network path between domain controllers in different regions, replicate control plane metadata across regions, and orchestrate updates across regions. To implement these features, embodiments use a cross region replicator 120 to communicate data and metadata between regional control planes and establishes cross region peering 122 between virtual networks hosting the directory service instances. As shown in FIG. 1, a cross-region directory service may include a home region directory service 101 and expanded region directory service 103, each making use of their respective regional control plane 104, 126, and data plane 106, 128 components. Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

In the embodiment of FIG. 1, in a given region, the data plane of a directory service may include a virtual network 108 associated with an account of the directory service and a virtual network 110 associated with the customer's account. These virtual networks may be logically isolated such that the computing devices in each VN are limited in how they can communicate with computing devices in any other VN. For example, communications between the directory VN 108 and customer VN 110 may be limited to being made through endpoints 116A-B. In some embodiments, a customer account in a region may correspond to a single directory account in that region. The directory VN 108 may include components across multiple areas (e.g., area 1 and area 2) of the home region. This may include an endpoint 112A, 112B to communicate with the region's control plane 104, 126, and a corresponding directory service instance 114A, 114B. The directory service instances may include domain controllers and other directory service components, to provider directory services to the customer's applications 118A-118B. In some embodiments, multiple domain controllers may be connected via a local area network or metropolitan area network to form a site.

As shown at numeral 1, cross-region peering connections 122 can be established between directory service instances in different regions of provider network 100. Directory services were developed to operate in a single region, which can lead to communication challenges between domain controllers in different regions. For example, some directory services, do not support callers using network address translation or calls received through a load balancer. This limits cross-region networking solutions to enable the domain controllers to communicate across regions. As such, the facilitate communication, a network path can be setup across regions using Cross-Region VPC Peering 122. To avoid potential collisions, IP address ranges, such as a Classless Inter-Domain Routing (CIDR) block, can be pre-allocated for the directory in each expanded region. The CIDR block can be pre-allocated when a new expanded region is setup to ensure that there are no IP address collisions between the addresses of existing virtual networks (e.g., directory virtual network 108 and any other virtual networks in other expanded regions 104A-104N). When an expanded region directory service 103 is setup, a new virtual network (e.g., directory VN 130) can be created in the expanded region based on the pre-allocated addresses (e.g., CIDR block) and the customer's virtual network in the expanded region. The CIDR block range allowance to the directory in the expanded region enables the cross-region VN peer connection(s) to be made between the directory VNs in each region. In some embodiments, the home directory service resides in its own VN (198.19.0.0/16), as shown in FIG. 1, consuming half of the private network address space reserved by RFC 1944, 198.18.0.0/15. The directory can be extended into another region 124 by creating a new /23 virtual network within the remaining 198.18.0.0/16 address space and connecting it back to the directory VN 108 with a VN peering connection 122. Individual peering connections may be created between every region in a full mesh topology to provide a highly available network. As discussed, the virtual networks within each region and in different regions may be logically isolated from the other virtual networks in the same region or in different regions. As such, communication between the virtual networks is limited to the cross region VN peer connection.

As discussed, a directory service instance may include multiple domain controllers. The domain controllers may be organized into sites, which control how domain controllers replicate their changes and how clients find a local domain controller. A properly configured Sites and Services will resemble the physical network topology. A directory site may correspond to a geographic area that includes domain controllers usually connected by a LAN or MAN. In some embodiments, a directory may include one or more directory sites in each region. The cross-region VN peer connection is a network link that connects two or more sites. Site links have an associated routing cost that can be configured to ensure that the most efficient network path is chosen. Due to the network cost of requesting data over the peering connection, when possible data may be attempted to be obtained from a local domain controller rather than a remote domain controller, particularly during setup of a new domain controller when a significant amount of data is being restored. In some embodiments, an in-region orchestrator determines how to configure a local domain controller, whether it can find another in-region domain controller or if it needs to use an expanded region domain controller. The routing cost can be used to determine which expanded region can be most efficiently contacted when an expanded region domain controller is needed to configure a new domain controller. Since the peering connections are configured in a one to one full mesh topology, the site links will also be created between each site in a full mesh topology. In some embodiments, route tables may be maintained in each region that are updated when a new cross-region peer connection is established. In some embodiments, a handshake may be performed between the directory VNs 108, 130 when a new link is established and the route table is updated so that traffic for the CIDR range assigned to other directory VN is routed over the peer connection to the directory VN.

Cross region replicator 120 may replicate control plane metadata selectively to the other regions of provider network 100 into which a customer's directory has been expanded. For example, rather than replicating to every region in provider network 100, the data and/or metadata may be replicated only to those regions into which the cross-region directory service has expanded. This metadata may be used for directory discovery by customer applications 118A, 118B, 140A, 140B, which may access the directory service instances via endpoints 116A, 116B, 138A, 138B. The metadata is also used to enable local read, availability and low latency across different directory service API's and is critical for management of directories across different asynchronous workflows like Recovery, Expand, and Restore, as discussed below. In some embodiments, each customer VN 110, 132 in each region of provider network 100 can communicate with a customer's on-premises network 142. For example, a trusted link can be established, enabling the customer's on-premises applications to use the directory services of the customer's directory (e.g., home region directory service 101 or expanded region directory service 124).

In some embodiments, a cross-region directory service also provides higher availability of the customer's directory. For example, if a customer's directory in the home region fails it can be recovered from an expanded region, or vice versa. For example, as discussed further below, a restore workflow may be performed based on the functioning domain controllers of another region to recover the failed directory in a different region. Additionally, updates may be applied to the directory in each region asynchronously. This allows for the directory to remain operable in other regions while it is being updated in one region. Requests for directory services may be rerouted to another region during the updates. Similarly, if a directory in one region becomes unreachable (e.g., due to power outage, transient errors, or other temporary or permanent outage conditions), requests for the directory in the region experiencing the outage may be rerouted to another region that is functioning. Once the local region has restored functionality, the requests may be failed-back to the local region.

Figure 2:
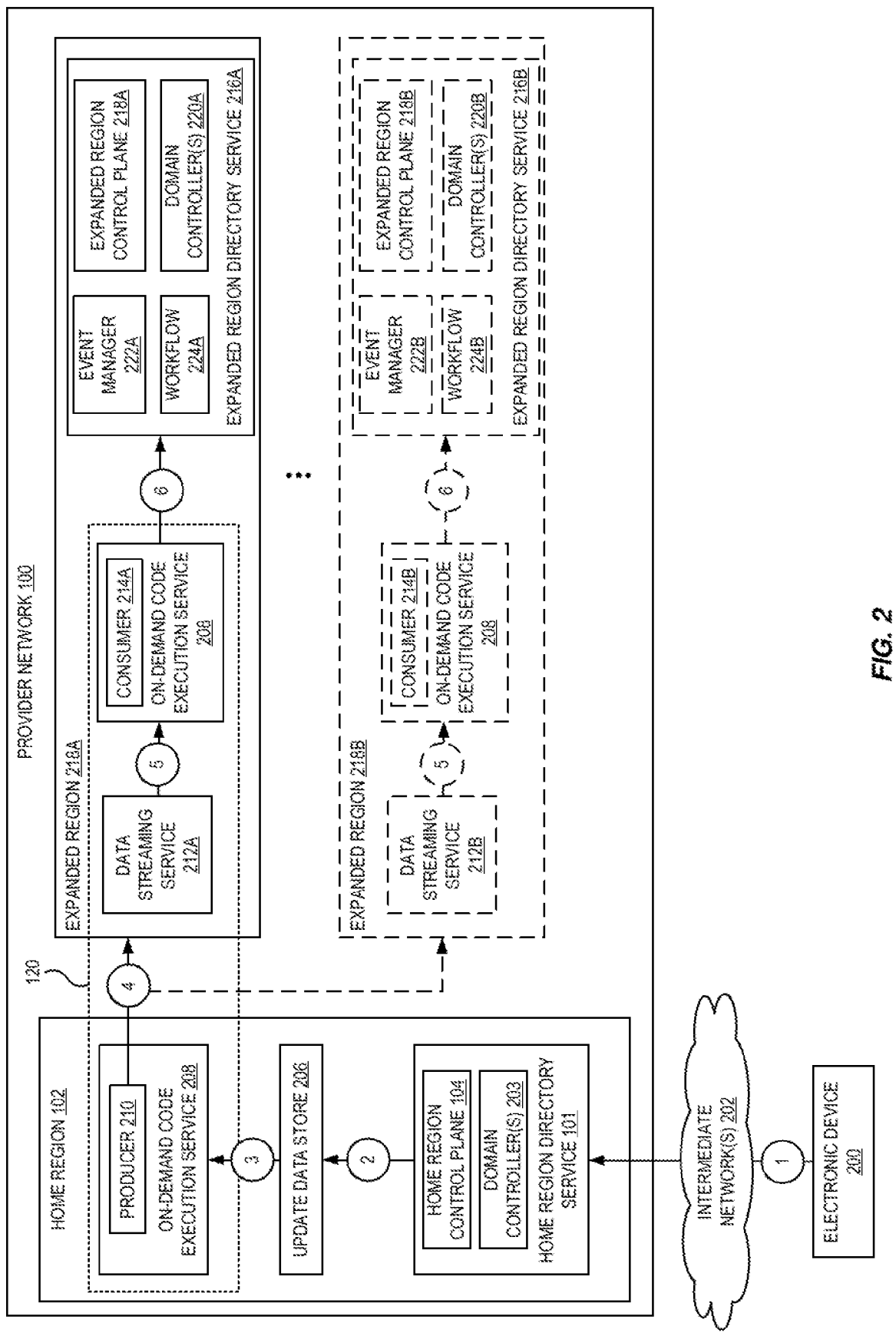
FIG. 2 is a diagram illustrating an environment for replicating control plane metadata across regions according to some embodiments.

FIG. 2 is a diagram illustrating an environment for replicating control plane metadata across regions according to some embodiments. Traditionally, directory services (e.g., name services) have been limited to a single region. However, it is advantageous to expand single region resources, such as directory service 101, to multiple regions, to provide for disaster recovery, lower latency, higher availability, etc. Directory service 101 may provide various features, including global and regional features, that enable a customer to maintain and manage a directory. The directory service enables a customer to locate, manager and administer their network resources (e.g., storage volumes, files, network devices, users and groups, etc.) and may additionally provide features such as single sign on support, multifactor authentication, and other access control features. Although embodiments are discussed herein with respect to replicating changes to a directory service, embodiments may be used to replicate changes for any service across different regions of a provider network.

To keep the directory resources in sync, data needs to be replicated between regions. As shown in FIG. 2, a cross region replicator service 120 can manage cross region replication of changes. A request to make a change to the directory can be received by a home region directory service 101 of provider network 100, at numeral 1. The request can be sent by a customer using electronic device 200 and may be received over one or more intermediate networks 202. In some embodiments, the request may include changing features, updating settings, or otherwise making changes to the customer's directory. These changes may be reflected as changes in control plane metadata or changes in settings data of the customer's directory. As shown, the home region directory service 101 may include one or more home domain controllers 203 and may be implemented in a virtual network as discussed. To keep the directory in sync across multiple regions 218A-218B, this change needs to be propagated to the domain controllers 220A-220B in those other regions into which the directory has expanded. Although in the example of FIG. 2, the request to update the customer's directory is received by the home directory service, in various embodiments, such a request may be received by the directory service in any region into which it has been expanded.

Once an update is received by the directory service 101, it can be stored in an update data store 206 at numeral 2. Update data store can output a log stream (e.g., a changelog) that includes the previous value and the value that was changed in the update. In various embodiment, each entry in the log stream may also be associated with attribute which may include region data that indicates which expanded regions are to receive the update. In some embodiments, the update data store 206 may provide a uniform resource locator (URL) or other address that other services can use to consume this update stream. In some embodiments, there may be multiple update data stores and/or data structures within an update data store (e.g., tables or other data structures) which correspond to different settings or features of the directory service. In some embodiments, the update stream can be consumed by an on-demand code execution service 208 at numeral 3.

The on-demand code execution service can include at least one producer function 210 which processes the update stream received from the update data store 206. In some embodiments, a different producer function may be invoked for each update data store and/or data structure in use (e.g., each producer function receives update data from a different update data store or data structure associated with directory service 101 in home region 102). In some embodiments, the producer function 120 can filter each entry in the update stream to determine which regions the update needs to be replicated to, based on the region data. At numeral 4, the producer function 120 can output the update from the update stream to each region determined to need the update. In some embodiments, each expanded region 218A-218B can include a data streaming service 212A-212B. The data streaming service receive data from the producer function and invoke a consumer function 214A-214B, respectively, to process the incoming update data, at numeral 5. In some embodiments, the data streaming service 212A-212B guarantees that update data will be processed in the order in which it is received from the producer function 210.

As shown in FIG. 2, each expanded region may include an event manager 222A-222B. In some embodiments, the event manager may be implemented as an application programming interface which is called by the consumer function to further process the incoming update data. In some embodiments, the event manager can store the update data to a local data store (not shown) and invoke a workflow 224A-224B that corresponds to the update data. In some embodiments, the consumer function can be content neutral, and the event manager 222A-222B is responsible for determining what to do (e.g., what corresponding workflow to call) in response to the update data that has been received. For example, the event manager may identify the workflow to be called based on the API request received. The workflow can then apply the update to the domain controller(s) 220A-220B and/or replicate data to the expanded region control plane(s) 218A-218B in each respective region to synchronize the domain controllers of the expanded region with those of the home region. In some embodiments, the event manager 222A-222B can analyze the update data to determine whether it needs to be applied. For example, the event manager can compare the value of the settings change to the current value of the corresponding setting of the local domain controllers. If the values match, then no update is required. In some embodiments, some settings may be regional. These settings may be associated with attributes that indicate that the value is regional and should not be modified based on a setting change in a different region.

The event manager can determine whether the setting is associated with such attributes and, if so, ignore the update.

In some embodiments, if any non-retriable failures are encountered, the update data the received the non-retriable failure can be written to a queue or other data structure that can be reviewed by an administrator. In some embodiments, non-retriable failure may include if a region is not supported to receive update data if the event manager cannot accept the data or it is duplicative.

In some embodiments, each region may encrypt settings, events, or other data using a region-specific password or other credential. When the data is replicated to an expanded region, the expanded region cannot access the data because it does not know the regional password. As such, the expanded region's event manager can send a request to the region from which it received the data for the password to decrypt the data. In some embodiments, regions may publish an API for other regions to use when they need the region's password to access data received from the region. Once decrypted, the event manager can encrypt the data using a password (or other credential) specific to the expanded region before storing the encrypted data to the local data store.

In some embodiments, if concurrent updates are to be applied to an expanded region, this may result in a conflict. The event manager of the expanded region can send a request to the home region to resolve this conflict. For example, the home region may publish a conflict resolution API which may be called by an expanded region when a conflict is detected. The home region can then determine how to apply the conflicting updates. In some embodiments, the home region may choose to have the latest update be applied and any earlier updates be ignored. In some embodiments, a hierarchy of regions may be used to determine which update is to apply. For example, if a first conflicting update is from a first region and a second conflicting update is from a second region, the relative positions of the first region and the second region in the hierarchy may be used to determine which update to apply (e.g., the update from the superior region in the hierarchy may be applied).

Figure 3:
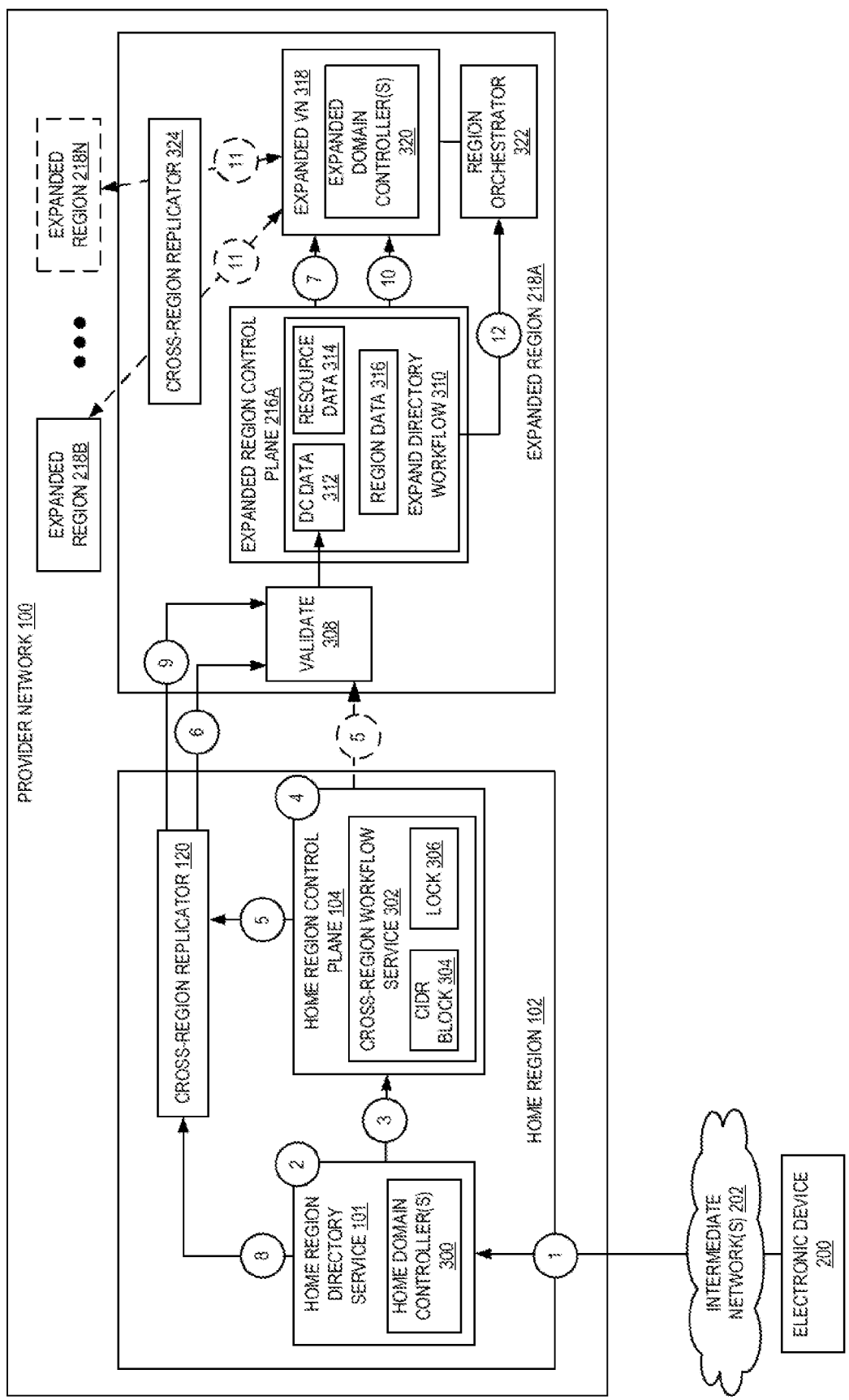
FIG. 3 is a diagram illustrating an expand workflow according to some embodiments.

FIG. 3 is a diagram illustrating an expand workflow according to some embodiments. As shown in FIG. 3, a customer may choose to expand an existing directory into one or more expanded regions. The existing directory may already exist in multiple regions, and another expanded region is being added, or the existing directory may be expanded from its home region into a new region. The expand workflow described herein is an example of a synchronous workflow orchestrated by cross-region workflow service 302. A user may send a request at numeral 1 to expand the directory service 101 into a new expanded region 218A. As discussed, the request may be received at the home domain controller 300 in the home virtual network of the directory service in the customer's home region 102.

At numeral 2, in response to the request from the customer, the directory service 101 can execute an addRegion application programming interface (API). The addRegion API can perform initial validations on the request. For example, the addRegion API can determine a number of expanded regions associated with the customers directory, and a number of expanded regions in progress. In some embodiments, the number of expanded regions associated with the customer's directory may be limited by the directory service. Additionally, or alternatively, the number of concurrent expansions (e.g., corresponding to the number of expanded regions in progress) may be limited by the directory service. In some embodiments, these limits may be adjusted dynamically, based on the amount of available resources in the home region 102 or the expanded regions in which the customer has already expanded or is in the process of expanding to. In some embodiments, the addRegion API may also validate the region into which the customer has requested to expand. For example, it can be determined whether the customer has already expanded into the requested region and, if so, an error may be returned.

Once the request has been validated, at numeral 3, the addRegion API can trigger cross-region workflow service 302 to begin the expand workflow to expand the customer's directory into the requested expanded region 218A. In some embodiments, the addRegion API may also handle any exceptions generated by the cross-region workflow service 302 and provide the exceptions to the customer for further review and/or input. At numeral 4, the cross-region workflow service 302 can obtain a lock 306 on directory 101. The lock 306 can be a global lock on the directory (e.g., a lock on the directory in every region into which it has been expanded) or a lock in a specific region or regions the directory is operating in. When a global lock is obtained, this prevents one region of the directory from becoming out of sync with other regions of the directory. In some embodiments, the lock 306 can be obtained using an Acquire-Lock API call which accepts a parameter for an amount of time the lock is to be in effect. Once lock 306 is obtained, an identifier may be associated with the lock and/or the requesting account. In some embodiments, if the expand workflow is taking longer than expected, the acquire-lock API may be called to extend the lock, using an identifier associated with the lock. Once the lock has been obtained, IP addresses, such as a Classless Inter-Domain Routing (CIDR) block 304, can be pre-allocated for the directory in the expanded region. By pre-allocating the CIDR block, the cross-region workflow service 302 can ensure that there are no IP address collisions between the addresses of existing virtual networks (e.g., home virtual network and any other virtual networks in other expanded regions 218A-218N). In some embodiments, at numeral 4 a new virtual network (e.g., expanded VN 318) can be created in the expanded region based on the pre-allocated addresses (e.g., CIDR block) and the customer's virtual network in the expanded region. The CIDR block range allowance to the directory in the expanded region enables the cross-region VN peer connection(s) to be made between the directory VNs in each region.

At numeral 5, once the global lock and CIDR block have been obtained, the cross-region workflow service 302 can call an expand directory workflow 310 in expanded region 104B. In various embodiments, the cross-region workflow service 302 can call an expand directory API to start the expand directory workflow in the expanded region. In some embodiments, each region in the provider network may be an opt-in region, which requires an access policy for every account that enables that account to access or otherwise operate in a new region. As a result, any requests coming into the expanded region 218A may first be validated by a validation service 308, to ensure the account associated with the request has access to the expanded region. Validation may be performed by an access control service which may determine whether there is an access control policy associated with the account granted access to the expanded region. In some embodiments, the request may be sent to the expanded region via the cross-region replicator 120, which passes the request, at numeral 6, to a validation service 308 before the expand workflow is invoked. In some embodiments, the request may be sent directly to the validation service. In some embodiments, every piece of orchestration in one region may be performed by a separate account from those performed in a second region, to maintain account isolation across regions. The expand directory API may receive parameters corresponding to a directory identifier for the customer's directory, a customer identifier, and details for the virtual network to be created (e.g., subnets, the pre-allocated CIDR block, etc.), the number of domain controllers to be provisioned, etc. In some embodiments, the expand directory API can also perform validation on the virtual network details to ensure a valid virtual network is being provisioned and then start the expand directory workflow 204. Although in the example of FIG. 3, the expand directory workflow is executed in the expanded region, in various embodiments, the expand directory workflow can be executed on any resources in provider network 100 which have access to expanded region 218A and are authorized to provision resources within expanded region 218A.

Expand directory workflow 310 can provision resources needed to expand the directory into the expanded region 218A, as shown at numeral 7. In some embodiments, the expand directory workflow 310 can obtain resource data 314 from the cross-region workflow service which identifies the resources to be provisioned. The resource data 314 received from the cross-region workflow service may also include the pre-allocated CIDR block for use in provisioning the new resources. This may include provisioning the expanded virtual network 318 in expanded region 218A and one or more expanded domain controllers 320 in the expanded virtual network. The expand directory workflow may also provision other resources such as subnets, routetables, security-groups, autoscaling groups, etc.

Once the resources have been provisioned, a directory site can be created in the region using the provision resources. The directory site enables information to be replicated among the domain controllers provisioned in the expanded region and may include one or more routes that define the most efficient ways of sending replication traffic between domain controllers in the provisioned resources. Peer connections between different regions may be associated with different costs (e.g., latency) depending on the underlying infrastructure connecting the different regions. For example, a region representing Australia may have lower cost connections to regions representing, e.g., Japan, Singapore, San Francisco, etc. because these regions are connected by underwater cables. As such, a connection from San Francisco to Australia has a lower cost than a connection from, e.g., Washington D.C. to Australia, which is not served by direct infrastructure. As such, a routing cost data structure may be maintained which identifies a cost associated with communications with every other region. When data needs to be replicated, the routing cost data structure can be used to identify a most efficient connection. In addition to replicating within the new directory site in the expanded region, information needs to be replicated from the domain controllers in the home region to the new domain controllers in the expanded region, to bring the new domain controllers in sync. To maintain region isolation, a different administrator account having different credentials can be created for the new region and data can be replicated using cross-region replicator 120 so that credential sharing is not required. In some embodiments, cross-region replicator 120 can replicate data stored in one or more data stores associated with a given virtual network to expanded virtual networks in expanded regions and/or generate events consumed by various other components expanded regions, such as each expanded region's region orchestrator. This allows data and events to be transferred from one region to another, without requiring credential sharing.

At numeral 8, the cross-region replicator can obtain domain controller data and/or metadata from one of the home domain controllers 300. In some embodiments, the home domain controllers 300 may include a main domain controller from which the data and/or metadata may be obtained. At numeral 9, the cross-region replicator 120 can replicate the data and/or metadata to expand directory workflow 310. In some embodiments, the message from the cross-region replicator may be validated to ensure the account associated with the cross-region replicator has access to the expanded region 218A before the data is replicated into the expanded region. The expand directory workflow can use this domain controller data and/or metadata 312 to setup at least one of the expanded domain controllers 320, at numeral 10. In some embodiments, the cross-region workflow service 302 may additionally setup endpoints in each region to enable the customer to access the domain controllers in each region. The endpoints may be implemented as network interfaces that are associated with the domain controllers or other resources of the directory service in each region. The network interfaces may receive traffic from the other regions to enable communication with the domain controllers and/or other resources of the expanded regions. Once this first expanded domain controller 320 has been setup using the domain controller data and/or metadata, any other domain controllers in the expanded region can be replicated from this first expanded domain controller.

After the expanded domain controllers 320 have been setup, peering connections can be established with domain controllers in other regions, at numeral 11. In some embodiments, the peering connections can be made via a cross-region replicator 324 in the expanded region 218A. Such peering connections enable a customer to route traffic between two or more virtual networks using private IP addresses. In some embodiments, expand directory workflow 310 can obtain region data 316 which includes address data for other expanded virtual networks in other expanded regions 218B-218N. The region data can be provided to the expanded domain controller 320 and used to send peering requests to the expanded virtual networks in the other expanded regions. In some embodiments, the expand directory workflow can wait until one or more of the peering requests have been accepted. The peering connections may be established by updating routing tables maintained in each expanded region using the CIDR ranges allocated to each expanded region. Once at least one peering request has been accepted, remaining setup of the expanded directory site can be handed off to a region orchestrator 322, at numeral 12, and the lock 306 can be released. The region orchestrator can manage setup of additional domain controllers 320, depending on the size of the directory being expanded or other configuration information included in the initial expand directory API request.

In some embodiments, once expansion into a region is in progress (e.g., after a CIDR block has been pre-allocated), a customer can send another add region request to the directory service in the home region and region expansion can continue in parallel.

Figure 4:
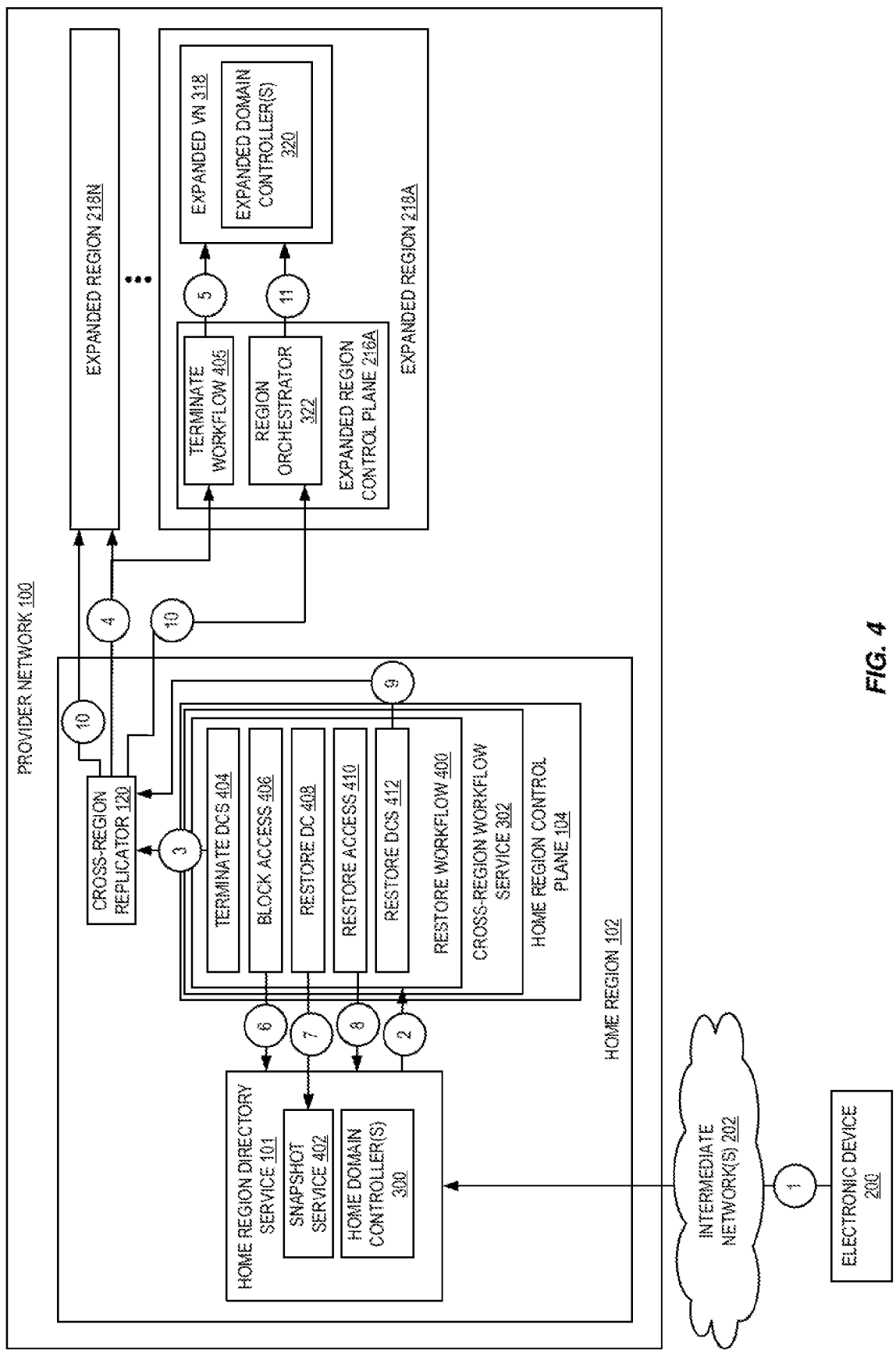
FIG. 4 is a diagram illustrating a restore workflow according to some embodiments.

FIG. 4 is a diagram illustrating a restore workflow according to some embodiments. As shown in FIG. 4, another cross-region workflow which may be performed is a restore workflow 400. In some embodiments, directory service 101 may provide a snapshot service 402 which can capture snapshots of a customer's domain controllers. In some embodiments, each virtual network in each region may include a snapshot service instance which periodically captures snapshots of the domain controllers in that region. In some embodiments, one snapshot service may capture snapshots of domain controllers from across all of the regions of the customer's directory. A user can send a request, at numeral 1, to directory service 101 to restore their directory from a snapshot. In some embodiments, the request may identify a snapshot to use to perform the restore.

At numeral 2, the directory service can call cross-region workflow service 302 to perform restore workflow 400. Restore workflow 400 can start by terminating 404 all domain controllers 320 in the expanded regions 218A-218N of the customer's directory. Although only two expanded regions are shown in the example of FIG. 4, this is for simplicity of explanation. As discussed, a customer may choose to have more, or fewer expanded regions in a given implementation. At numeral 3, the restore workflow can send a request to cross-region replicator 120 to terminate the customer's domain controllers across regions and set the domain state in each region to a restoring state. At numeral 4, the cross-region replicator can send an event to each expanded region to initiate a terminate workflow 405 to terminate all domain controllers in their respective regions. At numeral 5, the terminate workflow can terminate the domain controllers 320 in the expanded region. This may include deprovisioning the resources associated the with domain controllers (e.g., the virtual machine, container, or other host(s) on which the domain controllers are running). In some embodiments, new domain controllers may be provisioned on new resources during this step. As discussed above, in some embodiments, each communication from the cross-region replicator into an expanded region may be validated (e.g., by an access control service, not shown) before it propagates an event and/or data into the expanded regions, to ensure the account associated with the cross-region replicator has been granted access to the expanded regions.

Once the termination of the domain controllers in the expanded regions 218A-218N has begun, the restore workflow can block ingress communication 406 to the home virtual network, at numeral 6. In some embodiments, this may include changing firewall or other access control rules associated with the home virtual network 112. While the directory is running normally, such ingress communication is enabled so that the directory resources in each region can communicate with one another. This prevents any domain controllers which have not yet terminated from communicating with the home domain controller 300. Without blocking communication, incorrect data could be replicated. This allows for the restore operation to be performed on the home domain controller 300 in isolation.

At numeral 7, the restore workflow can restore 408 the home domain controller 300 using the snapshot selected by the customer. Once the home domain controller 300 has been restored, ingress communication access 410 can be restored at numeral 8. This may include updating the firewall or other access control rules to allow communication from one or more IP addresses, CIDR blocks, etc., corresponding to the expanded regions. Once communication access has been restored, at numeral 9 a request can be sent to the cross-region replicator to instruct all expanded regions to restore 412 their domain controllers. At numeral 10, the cross-region replicator 208 can instruct the region orchestrator in each expanded region to bring their respective domain controllers online. At numeral 11, the region orchestrator can synchronize its domain controllers with the restored home domain controller, effectively restoring the directory in the expanded region.

Figure 5:
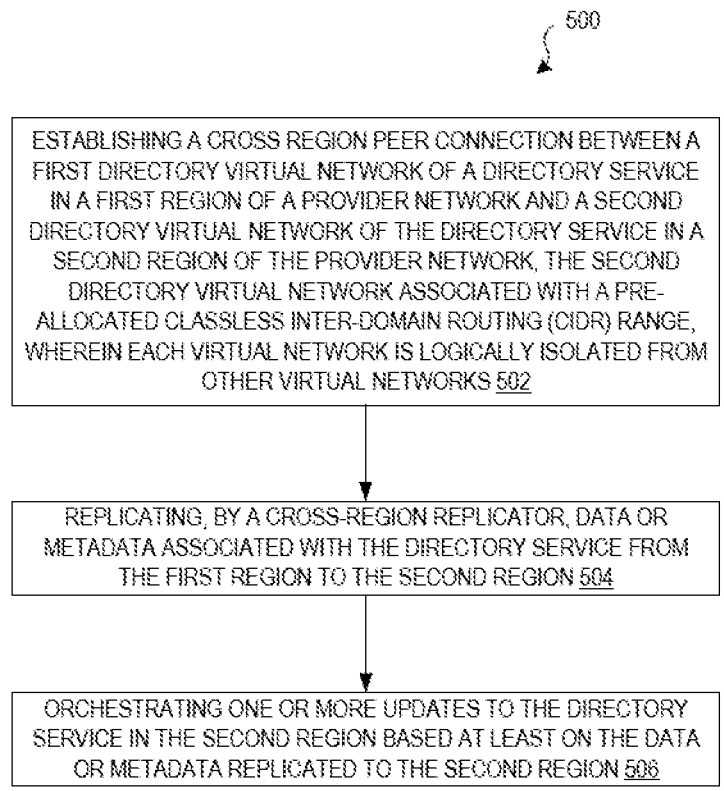
FIG. 5 is a flow diagram illustrating operations of a method for managing cross-region directory service according to some embodiments.

FIG. 5 is a flow diagram illustrating operations 500 of a method for managing a cross-region directory service according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the cross-region directory service, e.g., home region directory service 101, expanded region directory service 103, etc., of the other figures.

The operations 500 include, at block 502, establishing a cross region peer connection between a first directory virtual network of a directory service in a first region of a provider network and a second directory virtual network of the directory service in a second region of the provider network, the second directory virtual network associated with a pre-allocated classless inter-domain routing (CIDR) range, wherein each virtual network is logically isolated from other virtual networks. In some embodiments, establishing a cross region peer connection includes updating a route table in the home region for the expanded region using the CIDR range.

The operations 500 further include, at block 504, replicating, by a cross-region replicator, data or metadata associated with the directory service from the first region to the second region. In some embodiments, each region of the provider network into which the directory service is expanded establishes a peer connection with at least one other region of the provider network into which the directory service is expanded, wherein each region is associated with a different pre-allocated CIDR range.

The operations 500 further include, at block 506, orchestrating one or more updates to the directory service in the second region based at least on the data or metadata replicated to the second region. In some embodiments, orchestrating one or more updates to the directory service in the second region includes identifying a domain controller in an expanded region from which to replicate data to the second region based on a route cost table, the route cost table representing latencies between regions in the provider network. In some embodiments, orchestrating one or more updates to the directory service in the second region includes determining, by the event manager, a workflow to call to apply the change to the directory service in the second region, and calling the workflow to apply the change to the directory service in the second region.

In some embodiments, the operations further include replicating data from the domain controller in the expanded region using a peer connection between the second directory virtual network in the second region to a directory virtual network in the expanded region.

In some embodiments, the operations further include determining the directory service in the first region has failed, and recovering the directory service in the first region using the directory service in the second region. In some embodiments, the operations further include updating the first region asynchronously from the second region, wherein during the update to the first region requests for the directory service in the first region are routed to the directory service in the second region. In some embodiments, the operations further include determining the directory service in the first region is unreachable, and routing requests for the directory service in the first region to the directory service in the second region.

In some embodiments, the operations further include receiving a request to update the directory service in the first region of the provider network, and storing the update to a data store in the first region. In some embodiments, replicating data or metadata associated with the directory service from the first region to the second region further include receiving an event stream published by the data store by a producer function, the producer function to determine one or more regions of the provider network to which to replicate the change, the one or more regions corresponding to regions into which the directory service has been expanded, adding the change to a data streaming service in each of the one or more regions of the provider network, and receiving an output of the data streaming service by a consumer function, the consumer function to provide the change to an event manager. In some embodiments, the producer function and the consumer function are each implemented as on-demand functions maintained by an on-demand code execution service.

In some embodiments, the operations may include receiving a request at a directory service in a home region of a provider network to expand the directory service into an expanded region of the provider network, the directory service in the home region of the provider network including a home directory virtual network including a first plurality of domain controllers, provisioning an expanded region directory virtual network and a second plurality of domain controllers in the expanded region of the provider network, the expanded region directory virtual network associated with a pre-allocated classless inter-domain routing (CIDR) range, wherein each virtual network is logically isolated from other virtual networks, establishing a cross region peer connection between the home directory virtual network in the home region and the expanded region directory virtual network of the directory service in the expanded region, replicating, by a cross-region replicator, data or metadata associated with the directory service from the home region to the expanded region, and orchestrating one or more updates to the directory service in the expanded region based at least on the data or metadata replicated to the expanded region.

In some embodiments, the operations establishing a cross region peer connection may further include updating a route table in the home region for the expanded region using the CIDR range. In some embodiments, each region of the provider network into which the directory service is expanded establishes a peer connection with at least one other region of the provider network into which the directory service is expanded, wherein each region is associated with a different pre-allocated CIDR range.

Figure 6:
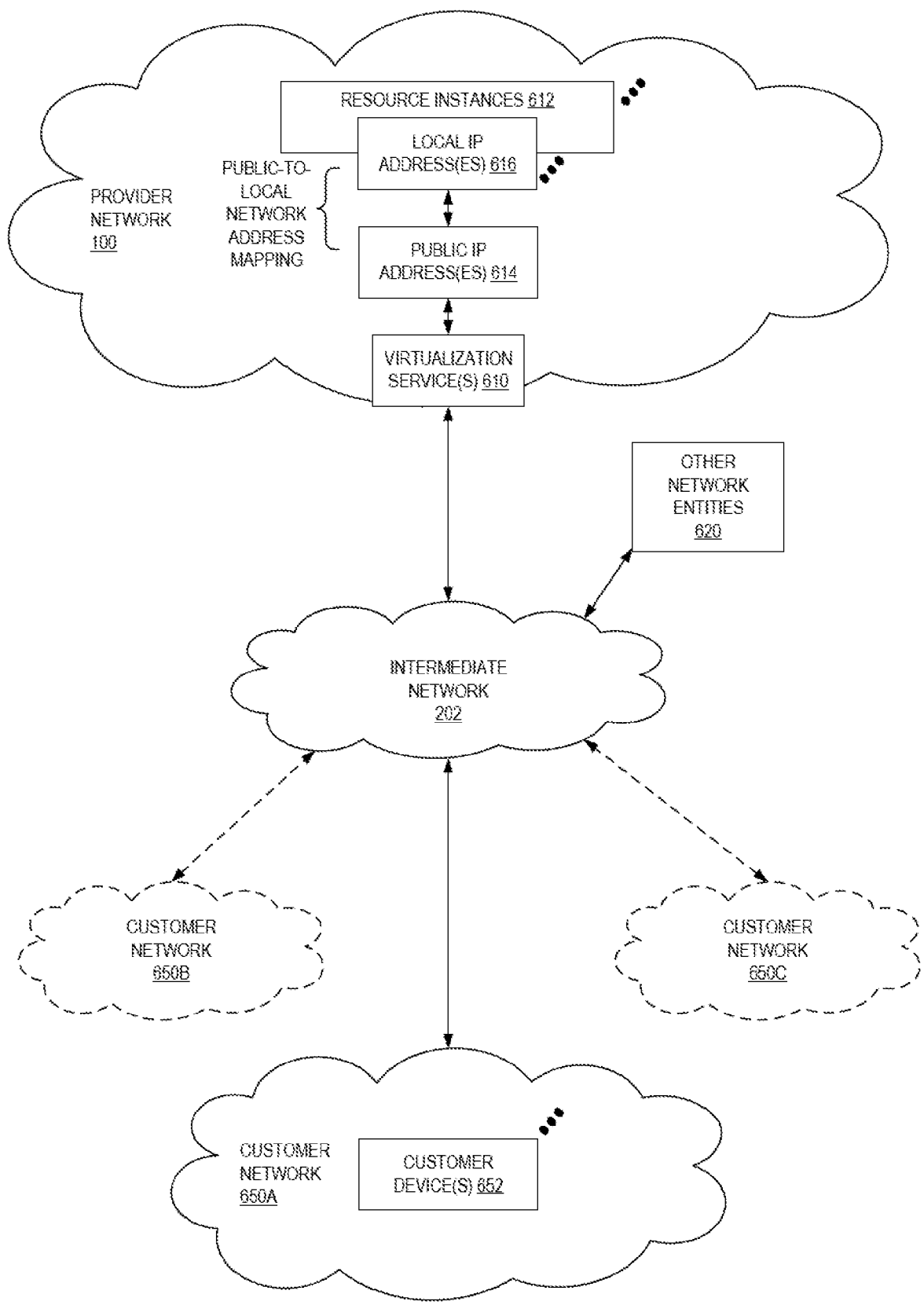
FIG. 6 illustrates an example provider network environment according to some embodiments.

FIG. 6 illustrates an example provider network (or "service provider system") environment according to some embodiments. A provider network 100 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 100. In some embodiments, the provider network 100 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 100, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 100 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 202, such as the Internet. Other network entities 620 on the intermediate network 202 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 202 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 100; a customer may then assign their allocated public IP addresses to particular resource instances allocated to the customer. These public IP addresses may be referred to as customer public IP addresses, or simply customer IP addresses. Instead of being assigned by the provider network 100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
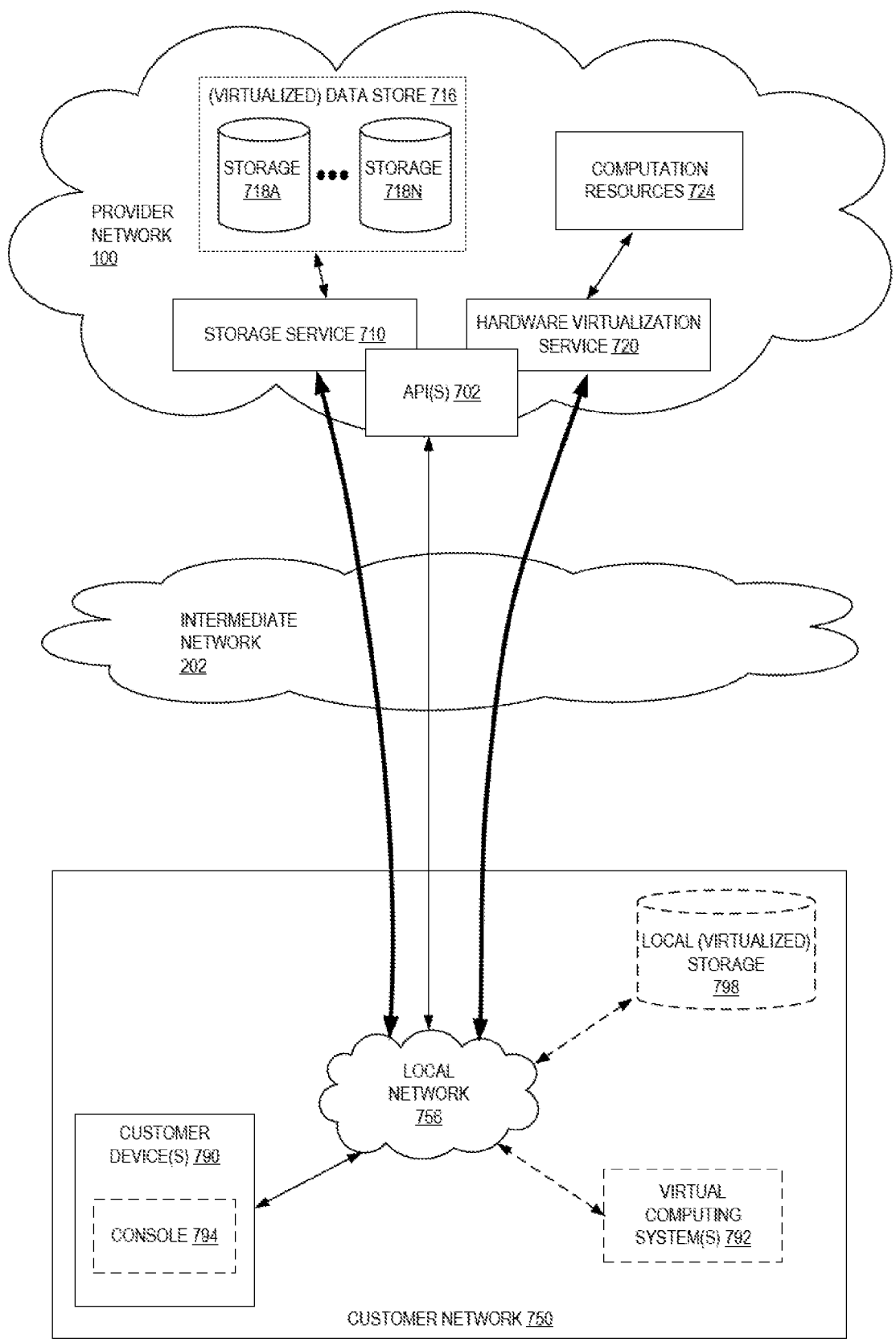
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 100 (e.g., to a customer that implements customer network 750). Each computation resource 724 may be provided with one or more local IP addresses. Provider network 100 may be configured to route packets from the local IP addresses of the computation resources 724 to public Internet destinations, and from public Internet sources to the local IP addresses of computation resources 724.

Provider network 100 may provide a customer network 750, for example coupled to intermediate network 202 via local network 756, the ability to implement virtual computing systems 792 via hardware virtualization service 720 coupled to intermediate network 202 and to provider network 100. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 100, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 100. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 100 via API(s) 702. For example, a customer, appliance service provider, or other entity may access a virtualization service from within a respective virtual network on the provider network 100 via an API 702 to request allocation of one or more resource instances within the virtual network or within another virtual network.

Illustrative Systems

Figure 8:
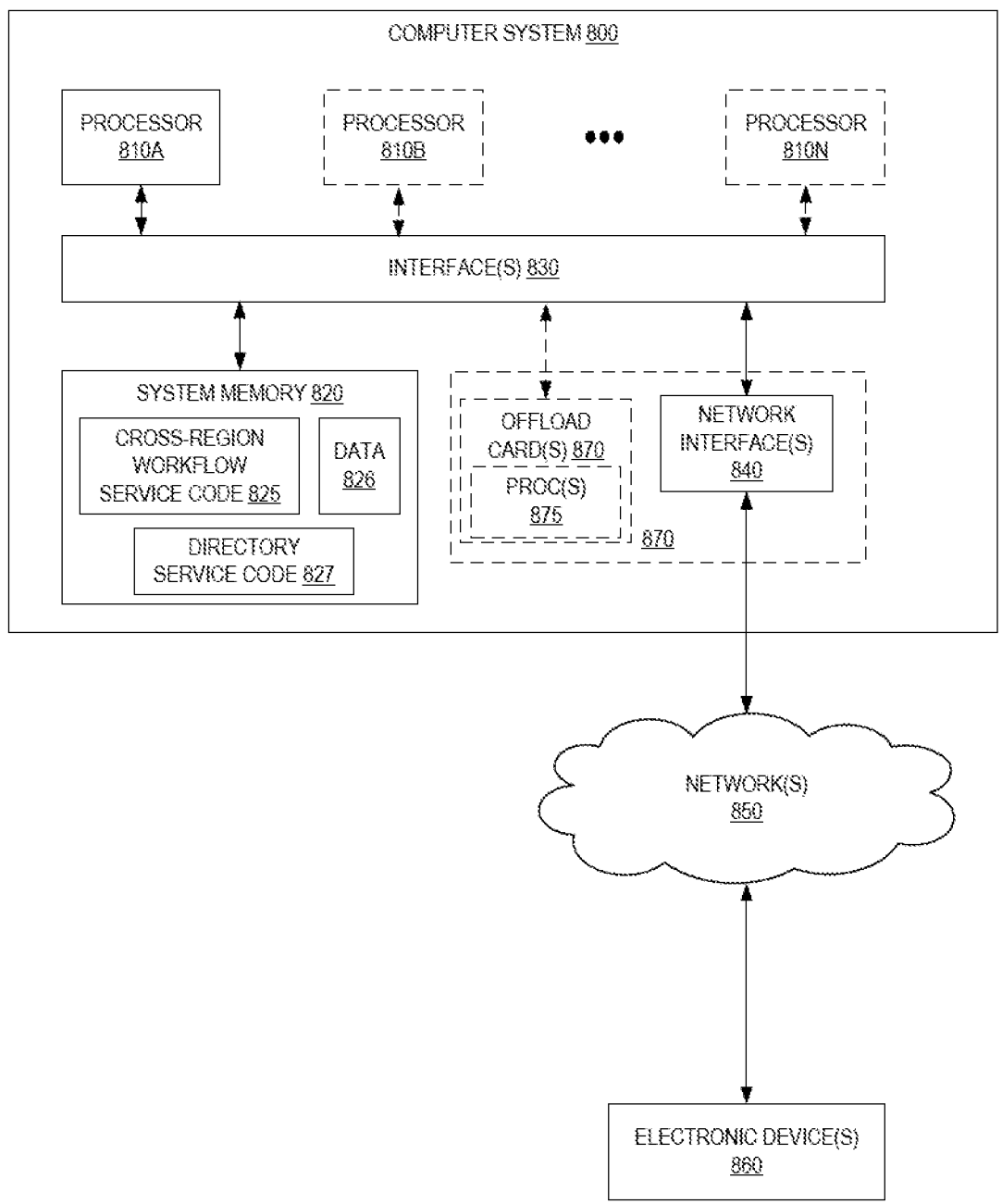
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as cross region workflow service code 825, directory service code 827, and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect - Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol / Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request at a directory service in a home region of a provider network to expand the directory service into an expanded region of the provider network, the directory service comprising domain services, the directory service in the home region of the provider network including a home directory virtual network including a first plurality of domain controllers;
   provisioning an expanded region directory virtual network and a second plurality of domain controllers in the expanded region of the provider network, the expanded region directory virtual network associated with a pre-allocated classless inter-domain routing (CIDR) range, wherein each virtual network is logically isolated from other virtual networks;
   establishing a cross-region virtual network peering connection between the home directory virtual network in the home region and the expanded region directory virtual network of the directory service in the expanded region, wherein traffic routed via the cross-region virtual network peering connection between the home directory virtual network in the home region and the expanded region directory virtual network of the directory service in the expanded region uses private Internet Protocol (IP) addresses, and wherein a route table in the home region for the expanded region is updated using the CIDR range;
   replicating, by a cross-region replicator, data or metadata associated with the directory service from the home region to the expanded region using the cross-region virtual network peering connection; and
   orchestrating one or more updates to the directory service in the expanded region based at least on the data or metadata replicated to the expanded region.

2. The computer-implemented method of claim 1, wherein each region of the provider network into which the directory service is expanded establishes the virtual network peering connection with at least one other region of the provider network into which the directory service is expanded, wherein each region is associated with a different pre-allocated CIDR range.

3. A computer-implemented method comprising:
establishing a cross-region virtual network peering connection between a first directory virtual network of a directory service in a first region of a provider network and a second directory virtual network of the directory service in a second region of the provider network, the directory service comprising domain services, the second directory virtual network associated with a pre-allocated classless inter-domain routing (CIDR) range, wherein each virtual network is logically isolated from other virtual networks, and wherein traffic routed via the cross-region virtual network peering connection between the first directory virtual network of the directory service in the first region of the provider network and the second directory virtual network of the directory service in the second region of the provider network uses private Internet Protocol (IP) addresses, and wherein a route table in the first region for the second region is updated using the CIDR range;
replicating, by a cross-region replicator, data or metadata associated with the directory service from the first region to the second region using the cross-region virtual network peering connection; and
orchestrating one or more updates to the directory service in the second region based at least on the data or metadata replicated to the second region.

4. The computer-implemented method of claim 3, wherein each region of the provider network into which the directory service is expanded establishes a virtual network peering connection with at least one other region of the provider network into which the directory service is expanded, wherein each region is associated with a different pre-allocated CIDR range.

5. The computer-implemented method of claim 3, wherein orchestrating one or more updates to the directory service in the second region based at least on the data or metadata replicated to the second region, further comprises:
identifying a domain controller in an expanded region from which to replicate data to the second region based on a route cost table, the route cost table representing latencies between regions in the provider network.

6. The computer-implemented method of claim 5, further comprising:
replicating data from the domain controller in the expanded region using a virtual network peering connection between the second directory virtual network in the second region to a directory virtual network in the expanded region.

7. The computer-implemented method of claim 3, further comprising:
receiving a request to update the directory service in the first region of the provider network; and
storing the update to a data store in the first region.

8. The computer-implemented method of claim 7, wherein replicating, by the cross-region replicator, data or metadata associated with the directory service from the first region to the second region, further comprises:
receiving an event stream published by the data store by a producer function, the producer function to determine one or more regions of the provider network to which to replicate the change, the one or more regions corresponding to regions into which the directory service has been expanded;
adding the change to a data streaming service in each of the one or more regions of the provider network; and
receiving an output of the data streaming service by a consumer function, the consumer function to provide the change to an event manager.

9. The computer-implemented method of claim 8, wherein orchestrating one or more updates to the directory service in the second region based at least on the data or metadata replicated to the second region, further comprises:
determining, by the event manager, a workflow to call to apply the change to the directory service in the second region; and
calling the workflow to apply the change to the directory service in the second region.

10. The computer-implemented method of claim 8, wherein the producer function and the consumer function are each implemented as on-demand functions maintained by an on-demand code execution service.

11. The computer-implemented method of claim 3, further comprising:
determining the directory service in the first region has failed; and
recovering the directory service in the first region using the directory service in the second region.

12. The computer-implemented method of claim 3, further comprising:
updating the first region asynchronously from the second region, wherein during the update to the first region requests for the directory service in the first region are routed to the directory service in the second region.

13. The computer-implemented method of claim 3, further comprising:
determining the directory service in the first region is unreachable; and
routing requests for the directory service in the first region to the directory service in the second region.

14. A system comprising:
a memory; and
one or more electronic devices coupled to the memory to implement a cross-region replicator and a cross-region directory service in a multi-tenant provider network, the one or more electronic devices comprising a processor, the cross region directory service comprising domain services, the cross-region directory service including instructions that upon execution cause the cross-region directory service to:
establish a cross-region virtual network peering connection between a first directory virtual network of the cross-region directory service in a first region of the provider network and a second directory virtual network of the cross-region directory service in a second region of the provider network, the second directory virtual network associated with a pre-allocated classless inter-domain routing (CIDR) range, wherein traffic routed via the cross-region virtual network peering connection between the first directory virtual network of the cross-region directory service in the first region of the provider network and the second directory virtual network of the cross-region directory service in the second region of the provider network uses private Internet Protocol (IP) addresses, and wherein a route table in the first region for the second region is updated using the CIDR range;
replicate data or metadata associated with the directory service from the first region to the second region using the cross-region replicator and the cross-region virtual network peering connection; and orchestrate one or more updates to the directory service in the second region based at least on the data or metadata replicated to the second region.

15. The system of claim 14, wherein each region of the provider network into which the directory service is expanded establishes a virtual network peering connection with at least one other region of the provider network into which the directory service is expanded, wherein each region is associated with a different pre-allocated CIDR range.

16. The system of claim 14, wherein to orchestrate one or more updates to the directory service in the second region based at least on the data or metadata replicated to the second region, the instructions, when executed, further cause the cross-region directory service to:

identify a domain controller in an expanded region from which to replicate data to the second region based on a route cost table, the route cost table representing latencies between regions in the provider network.

17. The system of claim 16, wherein the instructions, when executed, further cause the cross-region directory service to:

replicate data from the domain controller in the expanded region using a virtual network peering connection between the second directory virtual network in the second region to a directory virtual network in the expanded region.

\* \* \* \* \*